US011326925B2

(12) United States Patent
Liniger et al.

(10) Patent No.: US 11,326,925 B2
(45) Date of Patent: May 10, 2022

(54) PROBE UNIT WITH A SECUREMENT UNIT THAT RELEASABLY SECURES AN ELECTRODE ON THE PROBE BODY

(71) Applicant: Endress+Hauser SE+Co. KG, Maulburg (DE)

(72) Inventors: Jeannette Liniger, Baden (CH); Robert Schmidt, Schopfheim (DE); Franco Ferraro, Schopfheim (DE); Gerd Bechtel, Steinen (DE); Willy Huwyler, Cham (CH)

(73) Assignee: ENDRESS+HAUSER SE+CO. KG, Maulburg (DE)

(*) Notice: Subject to any disclaimer, the term of this patent is extended or adjusted under 35 U.S.C. 154(b) by 0 days.

(21) Appl. No.: 16/963,187

(22) PCT Filed: Dec. 18, 2018

(86) PCT No.: PCT/EP2018/085471
§ 371 (c)(1),
(2) Date: Jul. 17, 2020

(87) PCT Pub. No.: WO2019/141464
PCT Pub. Date: Jul. 25, 2019

(65) Prior Publication Data
US 2021/0123785 A1 Apr. 29, 2021

(30) Foreign Application Priority Data
Jan. 19, 2018 (DE) .................. DE10 2018 101 206.3

(51) Int. Cl.
G01F 23/263 (2022.01)
G01F 23/24 (2006.01)
G01N 27/22 (2006.01)

(52) U.S. Cl.
CPC .......... *G01F 23/268* (2013.01); *G01F 23/242* (2013.01); *G01N 27/226* (2013.01)

(58) Field of Classification Search
CPC ...... G01F 23/242; G01F 23/268; G01F 27/07; G01F 27/226
See application file for complete search history.

(56) References Cited

U.S. PATENT DOCUMENTS 2,754,457 A 7/1956 Meyers
4,217,499 A * 8/1980 Racz ..................... A61B 6/032
250/385.1

(Continued)

FOREIGN PATENT DOCUMENTS

CN 101218488 A 7/2008
CN 102116662 A 7/2011
(Continued)

*Primary Examiner* — Justin N Olamit
(74) *Attorney, Agent, or Firm* — Mark A. Logan; Endress+Hauser (USA) Holding Inc.

(57) ABSTRACT

Disclosed is a probe unit for a capacitive and/or conductive apparatus for determining and/or monitoring of at least one process variable of a medium in a containment, comprising a rod-shaped probe body, which is embodied in the form of a hollow body, especially with a cylindrical wall, and which has an internal volume, at least one ring-shaped electrode placeable, especially releasably, around the wall of the probe body, and at least one securement unit, which is embodied to secure the at least one electrode, especially releasably, at a predeterminable position on the probe body. Further disclosed is an apparatus for capacitive and/or conductive determining and/or monitoring of at least one process variable of a medium in a containment and having a probe unit of the present disclosure.

8 Claims, 3 Drawing Sheets

(56) References Cited

U.S. PATENT DOCUMENTS

| | | | |
|---|---|---|---|
| 4,855,706 A | | 8/1989 | Hauptly |
| 5,007,779 A | * | 4/1991 | Goran ..................... F16B 5/01 |
| | | | 411/41 |
| 5,103,368 A | * | 4/1992 | Hart ..................... G01F 23/268 |
| | | | 361/284 |
| 5,477,727 A | * | 12/1995 | Koga ..................... G01F 23/263 |
| | | | 361/284 |
| 5,532,527 A | | 7/1996 | Zatler et al. |
| 7,712,363 B2 | * | 5/2010 | Sasanuma ............. G01F 23/268 |
| | | | 73/295 |
| 9,500,512 B2 | * | 11/2016 | Schmidt .................. G01F 23/26 |
| 2007/0227887 A1 | * | 10/2007 | Sato ..................... G01F 23/268 |
| | | | 204/422 |
| 2013/0182742 A1 | | 7/2013 | Chang et al. |

FOREIGN PATENT DOCUMENTS

| | | |
|---|---|---|
| CN | 107003172 A | 8/2017 |
| DE | 1908750 A1 | 8/1970 |
| DE | 3212434 C2 | 6/1984 |
| DE | 102016119057 A1 | 4/2018 |
| EP | 0926474 A1 | 6/1999 |
| EP | 1754961 A1 | 2/2007 |

\* cited by examiner

PROBE UNIT WITH A SECUREMENT UNIT THAT RELEASABLY SECURES AN ELECTRODE ON THE PROBE BODY

CROSS-REFERENCE TO RELATED APPLICATIONS

The present application is related to and claims the priority benefit of German Patent Application No. 10 2018 101 206.3, filed on Jan. 19, 2018 and International Patent Application No. PCT/EP2018/085471, filed on Dec. 18, 2018, the entire contents of which are incorporated herein by reference.

TECHNICAL FIELD

The invention relates to a probe unit for a capacitive and/or conductive apparatus for determining and/or monitoring of at least one process variable of a medium in a containment. The process variable is, for example, a fill level of medium in the containment, the electrical conductivity of the medium or the permittivity of the medium. In the case of a fill level measurement, such can involve both a continuous fill level determination as well as also the detecting of a predeterminable limit level. The containment is, in turn, for example, a container or a pipeline.

BACKGROUND

Field devices based on the capacitive and/or conductive measuring principles are known per se from the state of the art and are manufactured by the applicant in many different embodiments and sold, for example, under the marks, Liquicap, Solicap and Liquipoint. Capacitive and conductive measuring devices have, as a rule, an essentially cylindrical sensor unit having at least one sensor electrode, which can be introduced at least partially into a container. On the one hand, rod-shaped sensor units extending vertically into the container are used widely, especially for continuous fill level measurement. For detecting a limit level, however, also sensor units introducible into a lateral wall of a container are known.

During measurement operation, the sensor unit is supplied with an excitation signal, as a rule, in the form of an alternating electrical current signal. From the response signal received by the sensor unit, then the particular process variable can be determined. In the capacitive measuring principle, the dependence of the response signal on the capacitance of the capacitor formed by the sensor electrode and the wall of the container, or the sensor electrode and a second electrode, is utilized. Depending on the conductivity of the medium, either the medium or an insulation of the sensor electrode forms the dielectric of the capacitor.

For evaluation of the response signal received from the sensor unit relative to the fill level, then, for example, either an apparent (total) electrical current measurement or an admittance measurement can be performed. In the case of an apparent electrical current measurement, the magnitude of the apparent electrical current flowing through the sensor unit is measured. Since the apparent electrical current has, however, an active portion and a reactive portion, in the case of an admittance measurement, besides the apparent electrical current, the phase angle between the apparent electrical current and the voltage applied to the sensor unit is measured. The additional determining of the phase angle enables, moreover, information concerning possible accretion formation to be gathered, such as is known, for example, from DE102004008125A1.

In the case of the conductive measuring principle, in contrast, it is determined, whether the conductive medium applied in the case of the conductive measuring principle is providing an electrical contact between a probe electrode and the wall of a conductive container or a second electrode.

Field devices in the form of multi-sensors, which can work both in a capacitive as well as also in a conductive operating mode, are known, for example, from the documents DE102011004807A1, DE102013102055A1 and DE102014107927A1. Besides the process variable, fill level, various medium specific properties, such as the electrical conductivity of the medium, and even dielectric properties of the medium, such as, for example, its dielectric constant, can be determined by means of such multi-sensors, this being described in DE102013104781A1.

A well known problem with capacitive and/or conductive field devices is the forming in the region of the sensor unit of accretions, which can significantly corrupt the measurement results. For preventing problems from accretion, on the one hand, an as high as possible frequency for the excitation signal can be selected, since basically the corrupting influence of accretion decreases with increasing frequency of the excitation signal. Designing an electronics of a corresponding field device suitably for high frequencies is, however, on the one hand, associated with an increased degree of complexity. Moreover, on the other hand, the additional cost factor for the required components is not negligible.

Alternatively, it is known to use a supplemental electrode, especially a so-called guard electrode, such as described, for example, in DE3212434C2. The guard electrode is, in such case, arranged coaxially around the sensor electrode and electrically isolated from such by insulation. It lies, furthermore, at the same potential as the sensor electrode.

The most varied of methods are known for manufacture of the sensor units. In the method known from DE-C2744820, the sensor unit includes an essentially rod shaped probe housing having an axial inner space, in which an areal electrode is arranged. First, a metal tube is injection molded internally and externally with a plastics layer. Then a probe electrode is connected with a metal wire and pushed onto an insulating body. The probe electrode is, in turn, screwed onto a threaded section of the metal tube. Finally, the entire arrangement is injection molded anew with a plastic coating.

In the case of the probe unit according to DE-C3328210, the probe housing is composed, in turn, of a tubular main part and a pot shaped cap. Arranged in the interior of the housing are three electrodes, of which a first electrode has the shape of a shallow pot lying tightly against the cap and the second and third electrodes are embodied tubularly. The first electrode serves as measuring electrode, while the other two electrodes provide shielding functions. The electrodes are arranged in the housing spaced from one another and electrically insulated from one another.

Finally, known from EP0926474T1 is a probe unit, in the case of which a radially compressible clamping cone is arranged in an axial, conical inner space of an essentially rod-shaped probe housing. Arranged on the clamping cone is at least one areal electrode, which is pressed by the clamping cone areally and gap-freely against a wall of the probe housing. The probe unit described in EP0926474T1 has the advantage that the probe unit can be manufactured cost effectively and without use of special tooling. In spite of the simplification achievable by the clamping cone, the described probe unit is still a comparatively complex construction. For example, it must always be assured in suitable manner, for example, as a result of suitable structural measures, that in the case of multiple electrodes the electrodes are electrically insulated from one another.

SUMMARY

Starting from the above-described state of the art, an object of the present invention is further to simplify the construction of a probe unit for a capacitive and/or conductive measuring device.

Regarding the probe unit, the object is achieved by a probe unit for a capacitive and/or conductive apparatus for determining and/or monitoring of at least one process variable of a medium in a containment. The probe unit has a rod-shaped probe body, which is embodied in the form of a hollow body, especially with a cylindrical wall, and which has an internal volume. The probe unit includes, moreover, at least one, ring-shaped electrode placeable, especially releasably, around the wall of the probe body, and at least one securement unit, which is embodied to secure the at least one electrode, especially releasably, at a predeterminable position on the probe body.

The securement unit is embodied to secure the at least one ring-shaped electrode on the probe body at a predeterminable position, especially along a longitudinal axis of the probe body. Preferably, the securement unit is at least partially an integral component of the probe body. Because of the securement unit, the probe unit of the invention is simple to produce and, especially, especially easily assemblable without the need of special tools.

The ring-shaped embodiment of the at least one electrode is, furthermore, especially metrologically advantageous. Areally embodied electrodes designed for probe units of the state of the art to surround the probe body have frequently an interruption. According to the invention, in contrast, a continuous, ring-shaped electrode can be used, this being especially advantageous relative to the electrical fields between the electrodes or the electrode and the wall in the application of the capacitive measuring principle.

An embodiment of the probe unit of the invention includes that at least one opening is provided, which is arranged in the region of the probe body near the at least one electrode and through which an, especially electrical, connection is producible between the electrode and at least one additional component of the apparatus, especially a printed circuit board, which can be introduced into an internal volume of the probe body. The electrodes are, in such case, in each case, arranged in an outer region of the probe body, and can be connected via the at least one opening electrically with components located within the probe body, especially printed circuit boards.

Another embodiment includes that the electrode has an electrical contact spring, which leads from the electrode into the internal volume of the probe body, when the electrode is secured on the probe body. Compared to simple contact wires, in this way, an increased stability of the electrical contact between the respective electrode and the component arranged in the interior of the probe housing can be achieved.

Regarding the securement unit, an embodiment provides that the securement unit has at least one snap element. In such case, it is especially an element, which can assume at least first and second positions, and which for securing the electrode snaps from the first into the second position. In this way, a releasable securing of the electrode on the probe housing can be achieved.

Regarding the snap element, it is here advantageous that in a first position of the snap element the electrode is placeable around the probe body, and wherein in a second position of the snap element a securement of the electrode at the predeterminable position on the probe body occurs.

Regarding the electrodes, it is, in turn, advantageous that the at least one electrode is a cast part, a turned part, or a ring-shaped, sheet metal part. Corresponding parts are especially easily and cost effectively manufacturable.

Another especially preferred embodiment includes that the probe unit includes at least two electrodes, wherein a first electrode is securable by means of a first securement unit at a first predeterminable position on the probe body, and wherein a second electrode is securable by means of a second securement unit at a second predeterminable position on the probe body. The first electrode serves then preferably as measuring electrode and the second, for example, as guard electrode.

Advantageously in this regard, the two securement units are embodied and arranged in such a manner that the first and second electrodes are electrically insulated from one another, especially have a predeterminable separation from one another.

Regarding the probe body, finally, an embodiment includes that the probe body is made of an electrically insulating material.

The object underpinning the invention is achieved, furthermore, by an apparatus for capacitive and/or conductive determining and/or monitoring of at least one process variable of a medium in a containment, comprising a probe unit of the invention.

It is to be noted here that the embodiments described for the probe unit of the invention can be applied mutatis mutandis also to the apparatus of the invention.

BRIEF DESCRIPTION OF THE DRAWINGS

The invention will now be more exactly described based on the appended drawing, the figures of which show as follows.

DETAILED DESCRIPTION

Figure 1:
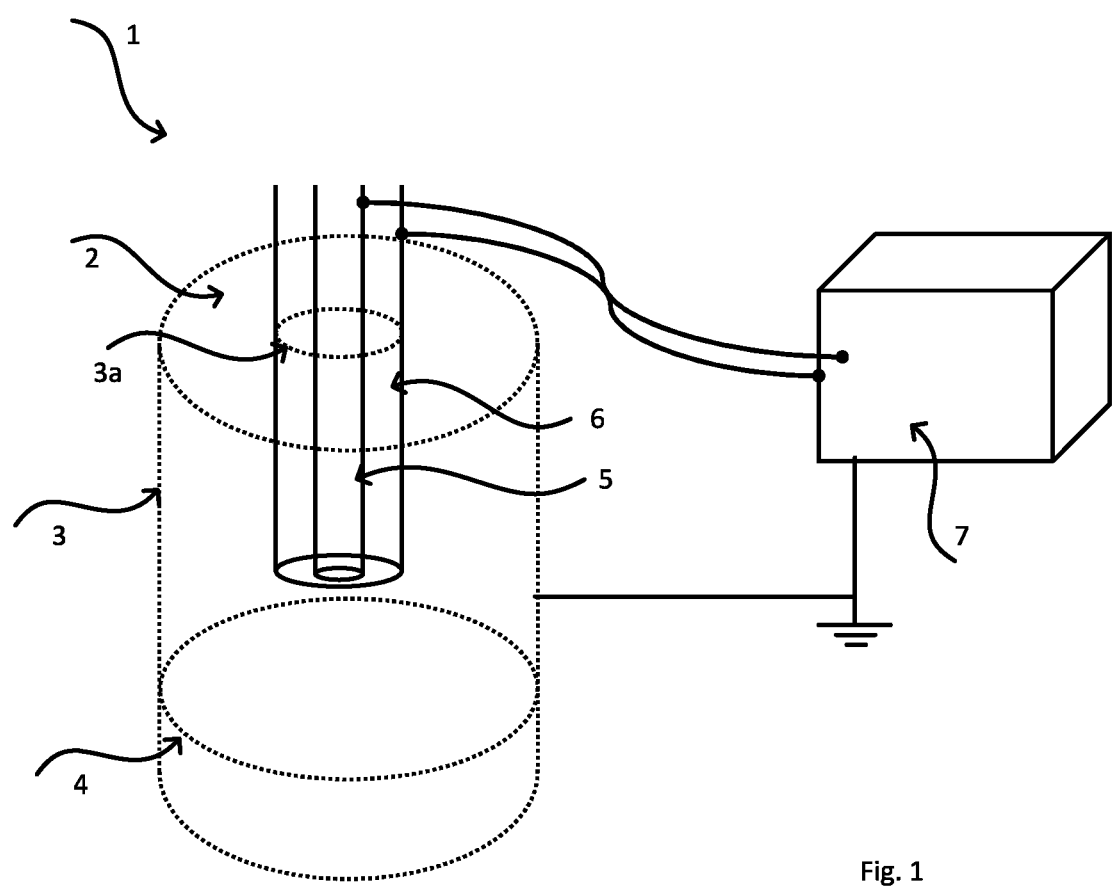
FIG. 1 shows a schematic view of a capacitive, fill level measuring device according to the state of the art.

FIG. 1 shows a schematic drawing of a typical, capacitive measuring principle based, field device 1 according to the state of the art. The example shows a probe unit 2 with two cylindrically embodied electrodes 5, 6. The probe unit 2 protrudes inwardly into a container 3 partially filled with medium 4, starting from a process connection 3a at the top of the container 3. Of course, numerous other embodiments for a capacitive measuring device 1 with different number and embodiment of electrodes 5, 6 are known, which all fall within the scope of the present invention. Besides such measuring devices 1, in the case of which the probe unit 2 protrudes, such as shown in FIG. 1, from above into the container 3, the present invention relates also to probe units 2, which are introduced into a side wall of the container 3.

Probe unit 2 includes in the present example a probe electrode 5 serving as measuring electrode and a guard electrode 6 coaxially surrounding the sensor electrode 5 and insulated therefrom. The two electrodes 5, 6 are electrically connected with an electronics unit 7, which is responsible, among other things, for signal registration,
—evaluation and/or—feeding. For determining the particular process variable, at least the probe electrode 5 is supplied with an excitation signal E and the process variable is ascertained based on the received signal R, usually in the form of an alternating current, received from the probe electrode 5.

Guard electrode 6 is, in such case, preferably, such as described, for example, in DE 32 12 434 C2, operated at the same potential as the sensor electrode 5. It is noted, however, that a guard electrode 6 is not absolutely necessary for a capacitive and/or conductive measuring device 1.

In the case of the present invention, there is provided for a capacitive and/or conductive measuring device 1 a probe unit 2, which has an especially simple construction. An especially preferred embodiment of a probe unit 2 of the invention is shown, by way of example, in FIG. 2.

Figure 2A:
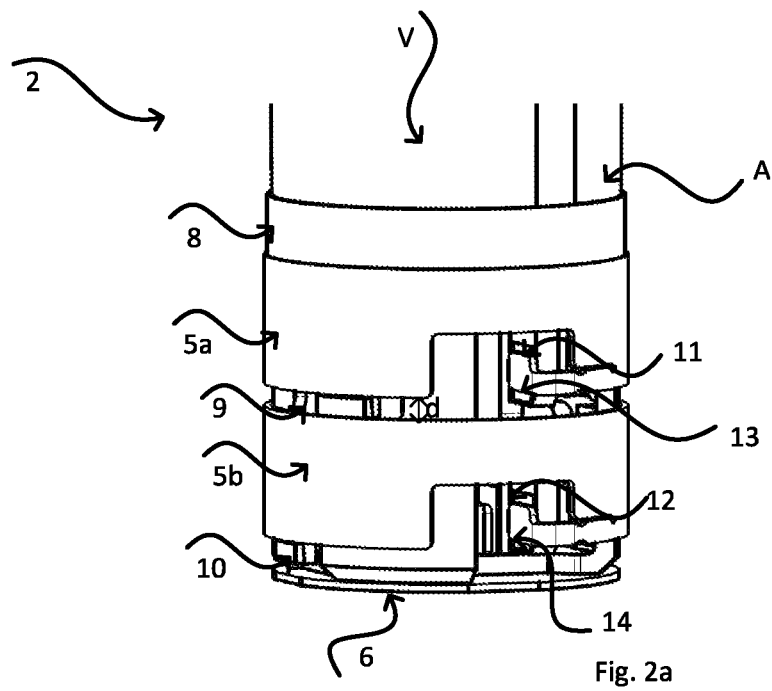
FIG. 2 shows a preferred embodiment of a probe unit of the present disclosure.

FIG. 2a shows a perspective view of the probe unit 2. Probe unit 2 includes a rod-shaped probe body 8. Probe body 8 is cylindrically embodied in the present example and preferably produced of an electrically insulating material. Probe body 8 here is a hollow body having an internal volume V. Arranged in the internal volume V are, for example, individual components (not shown) of the apparatus 1, especially printed circuit boards. Arranged around the lateral surface A of the probe body 8 are two ring-shaped electrodes 5a, 5b. These are metallically conductive, areal elements present in the form of closed, i.e. complete, rings, and can be, for example, cast parts, turned parts, and even closed, ring-shaped, sheet metal parts. Moreover, the probe unit 2 includes a third electrode 6, which is areally embodied and located on an end face of the probe body 8. In other embodiments, a probe unit of the invention 2 can also have only two electrodes, or more than three electrodes. It is, furthermore, an option to embody all electrodes ring-shaped, such as in the case of the first and second electrodes 5a and 5b of FIG. 2a, or to provide for at least one of the electrodes an alternative, for example, planar, embodiment, such as in the case of the third electrode 6 of FIG. 2a.

The two, ring-shaped electrodes 5a, 5b of the invention are, in each case, secured with a securement unit 9, 10 on the probe body 8 in such a manner that they automatically have a predeterminable separation d relative to one another. Advantageously, the circularly shaped electrodes 5a, 5b can in the case of the present invention, in each case, be secured in simple manner at a predeterminable position on the probe body 8. Because of the securement at these predeterminable positions, the electrodes 5a, 5b are automatically electrically insulated from one another. No complicated working steps or special components are necessary for this.

Probe body 8 includes, furthermore, two openings 11, 12, each of which is arranged in the region of one of the ring-shaped electrodes 5a, 5b. Because of the openings 11, 12, electrical connections of the electrodes 5a, 5b can be made with components of the apparatus 1 located in the internal volume V of the probe body 8. In such case, involved, especially, is a component of the apparatus 1, especially of the electronics unit 7, for example, a printed circuit board. Advantageously, a securement unit 9, 10 and an opening 11, 12 is provided for each electrode 5a, 5b.

Figure 2B:
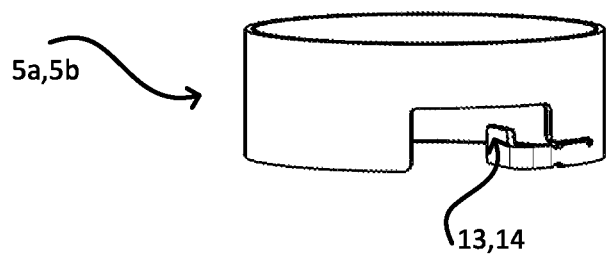

FIG. 2b shows a separate view of a ring-shaped electrode 5a, 5b of the invention. Each of the electrodes 5a, 5b is provided in the illustrated embodiment with an electrical contact spring 13, 14, which is embodied in such a manner that it leads into the internal volume V of the probe body 8, when the electrode 5a, 5b is secured on the probe body 8.

The diameter of the electrodes 5a, 5b is, furthermore, in each case, matched to the diameter of the probe body 8, in such a manner that the electrodes 5a, 5b can be placed essentially accurately fit around the probe body 8. Especially, the occurrence of air gaps between the electrodes 5a, 5b and the probe body 8 can be avoided.

Figure 2C:
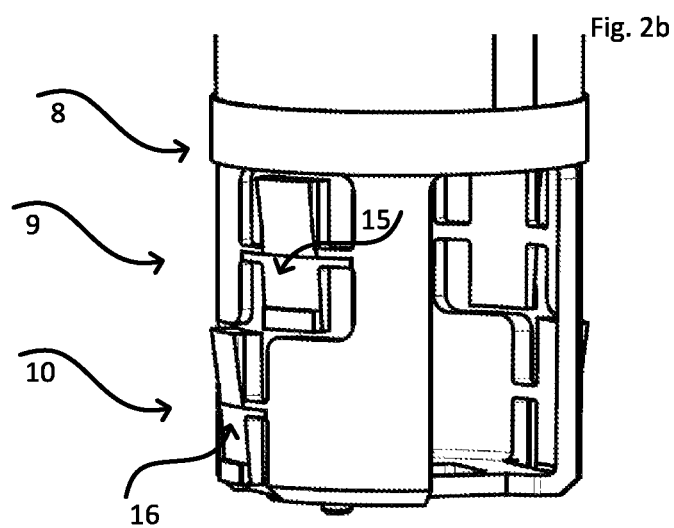
Figure 3:
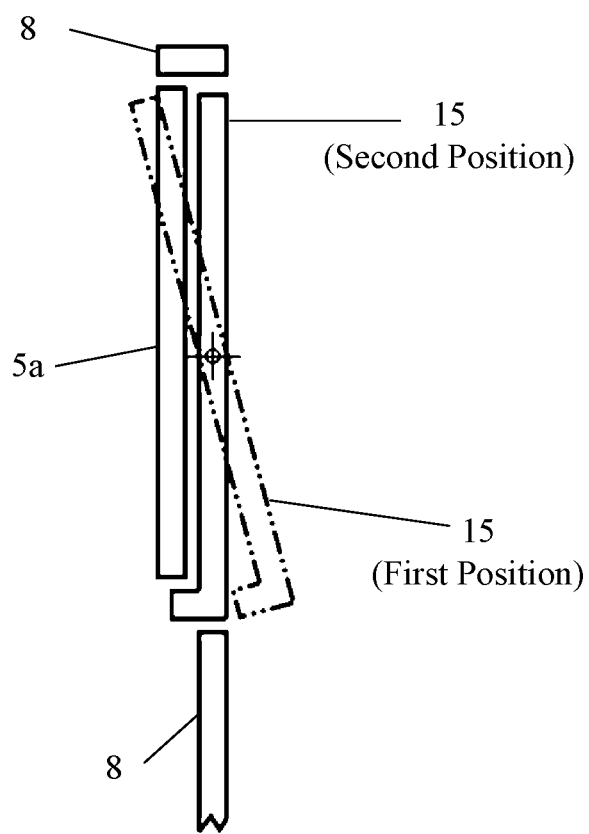
FIG. 3 shows a snap element 15 in a first position and in a second position.

In the present example, the two securement units 9, 10 are integrated in the probe body 8, such as best shown in FIG. 2c. Each securement unit 9, 10 comprises a plurality of snap elements 15, 16. In other embodiments, other securements can be implemented. Also, it is an option to use only a single snap element 15, 16 per securement unit 9, 10. Snap elements 15, 16 offer the advantage that the electrodes 5a, 5b can be mounted releasably on the probe body 8. In a first position of the snap elements 15, 16, the electrodes 5a, 5b can be slid onto the probe body 8.

The invention claimed is:

1. A probe unit for a capacitive and/or conductive apparatus for determining and/or monitoring at least one process variable of a medium in a containment, the probe unit comprising:
   a rod-shaped probe body embodied in the form of a hollow body having a cylindrical wall and an internal volume;
   at least one ring-shaped electrode releasably placeable around the wall of the probe body; and
   at least one securement unit embodied to releasably secure the at least one electrode at a predeterminable position on the probe body,
   wherein, in a region of the probe body, at least one opening is provided that is arranged in a region of the at least one electrode and through which an electrical connection is producible between the at least one electrode and at least one additional component of the apparatus that can be introduced into the internal volume of the probe body, and
   wherein the at least one electrode includes an electrical contact spring which leads from the at least one electrode into the internal volume of the probe body when the at least one electrode is secured on the probe body.

2. The probe unit as claimed in claim 1,
   wherein the at least one securement unit has at least one snap element.

3. The probe unit as claimed in claim 2,
   wherein in a first position of the at least one snap element the electrode is placeable around the probe body, and wherein in a second position of the at least one snap element a securement of the at least one electrode in the predeterminable position on the probe body occurs.

4. The probe unit as claimed in claim 1,
   wherein the at least one electrode is a cast part, a turned part, or a ring-shaped, sheet metal part.

5. The probe unit as claimed in claim 1,
   wherein the at least one electrode includes at least two electrodes, wherein a first of the at least two electrodes is securable by means of a first securement unit at a first predeterminable position on the probe body, and wherein a second of the at least two electrodes is securable by means of a second securement unit at a second predeterminable position on the probe body.

6. The probe unit as claimed in claim 5,
   wherein the two securement units are arranged and embodied such that the first electrode and the second electrode are electrically insulated from one another and have a predeterminable separation from one another.

7. The probe unit as claimed in claim 1,
wherein the probe body is made of an electrically insulating material.

8. An apparatus for capacitive and/or conductive determining and/or monitoring of at least one process variable of a medium in a containment, comprising:
a probe unit, including:
- a rod-shaped probe body embodied in the form of a hollow body having a cylindrical wall and an internal volume;
- at least one ring-shaped electrode releasably placeable around the wall of the probe body; and
- at least one securement unit embodied to releasably secure the at least one electrode at a predeterminable position on the probe body,
- wherein, in a region of the probe body, at least one opening is provided that is arranged in a region of the at least one electrode and through which an electrical connection is producible between the at least one electrode and at least one additional component of the apparatus that can be introduced into the internal volume of the probe body, and
- wherein the at least one electrode includes an electrical contact spring which leads from the at least one electrode into the internal volume of the probe body when the at least one electrode is secured on the probe body.

\* \* \* \* \*